US008130397B2

(12) United States Patent
Reichhart

(10) Patent No.: US 8,130,397 B2
(45) Date of Patent: Mar. 6, 2012

(54) METHOD FOR TRANSMITTING A COLOR EXTRACTION AND A MANAGEMENT INFORMATION SYSTEM

(75) Inventor: Thomas Reichhart, Aldenhoven (DE)

(73) Assignee: Hiflex Software GesmbH, Vienna (AT)

( * ) Notice: Subject to any disclaimer, the term of this patent is extended or adjusted under 35 U.S.C. 154(b) by 1012 days.

(21) Appl. No.: 11/915,442

(22) PCT Filed: May 22, 2006

(86) PCT No.: PCT/EP2006/004815
§ 371 (c)(1),
(2), (4) Date: Nov. 26, 2007

(87) PCT Pub. No.: WO2006/125578
PCT Pub. Date: Nov. 30, 2006

(65) Prior Publication Data
US 2008/0192284 A1 Aug. 14, 2008

(30) Foreign Application Priority Data

May 24, 2005 (DE) .......................... 10 2005 024 473

(51) Int. Cl.
*G06F 3/12* (2006.01)
*H04N 1/46* (2006.01)
*H04N 1/32* (2006.01)

(52) U.S. Cl. ........................ 358/1.15; 358/501; 358/442

(58) Field of Classification Search ................. 358/1.15, 358/1.9, 1.16, 1.2, 1.6, 515, 523, 1.13, 1.14, 358/442, 444, 402, 468, 401, 501, 403, 404, 358/407; 382/162, 276, 277
See application file for complete search history.

(56) References Cited

U.S. PATENT DOCUMENTS

| | | | | |
|---|---|---|---|---|
| 6,441,920 B1 * | 8/2002 | Smith | | 358/1.2 |
| 7,427,995 B2 * | 9/2008 | Farrah | | 345/619 |
| 7,734,492 B2 * | 6/2010 | Sun et al. | | 705/7.12 |
| 8,031,359 B2 * | 10/2011 | Hino et al. | | 358/1.15 |
| 2002/0191213 A1 * | 12/2002 | Laverty et al. | | 358/1.15 |
| 2003/0156299 A1 * | 8/2003 | Martinez et al. | | 358/1.9 |
| 2004/0030997 A1 * | 2/2004 | Farrah | | 715/530 |
| 2004/0080765 A1 * | 4/2004 | Nishide et al. | | 358/1.9 |
| 2004/0098322 A1 * | 5/2004 | Kalbfleisch et al. | | 705/28 |
| 2004/0145758 A1 * | 7/2004 | Lamy et al. | | 358/1.9 |
| 2004/0190057 A1 * | 9/2004 | Takahashi et al. | | 358/1.15 |
| 2005/0043845 A1 * | 2/2005 | Wiechers | | 700/115 |
| 2005/0105129 A1 * | 5/2005 | Takahashi | | 358/1.15 |
| 2005/0141006 A1 * | 6/2005 | Aiyama | | 358/1.13 |
| 2005/0256818 A1 * | 11/2005 | Sun et al. | | 706/46 |
| 2006/0039707 A1 * | 2/2006 | Mima | | 399/23 |
| 2006/0170996 A1 * | 8/2006 | Headley et al. | | 358/518 |
| 2006/0171002 A1 * | 8/2006 | Mori | | 358/538 |
| 2006/0232818 A1 * | 10/2006 | Hino et al. | | 358/1.15 |
| 2006/0242002 A1 * | 10/2006 | Sun et al. | | 705/11 |
| 2006/0262339 A1 * | 11/2006 | Jacobs et al. | | 358/1.14 |
| 2007/0051161 A1 * | 3/2007 | Friedman et al. | | 73/10 |
| 2007/0271131 A1 * | 11/2007 | McCaskill | | 705/10 |
| 2008/0192284 A1 * | 8/2008 | Reichhart | | 358/1.15 |
| 2008/0216695 A1 * | 9/2008 | Ozaki et al. | | 101/484 |
| 2009/0125342 A1 * | 5/2009 | Reichhart | | 705/7 |
| 2009/0319460 A1 * | 12/2009 | Reichhart | | 706/47 |

FOREIGN PATENT DOCUMENTS

DE 43 28 026 A1 3/1995
EP 1 155 845 A2 11/2001

* cited by examiner

*Primary Examiner* — Madelein A Nguyen
(74) *Attorney, Agent, or Firm* — von Rohrscheidt Patents

(57) ABSTRACT

A method is disclosed on the one hand for transmitting a color extraction, defining positions of pixels of a print color to be deposited onto a print sheet in a print run, in order to produce a print product, from a prepress system to a press system, and on the other hand a management information system for integrated planning and control of the production of print products in a networked graphic production, wherein a prepress system and a press system can be connected to the management information system. In order to facilitate a conclusive management of the color information in the context of a CIP4 workflow, it is suggested that the color extraction is initially transmitted from the prepress system to a management information system, and subsequently there from to the press system. Additionally it is proposed for this purpose to provide on the one hand a data input in a management information system, through which data of a color extraction, transmitted by the prepress system, defining positions of pixels in a print color to be deposited on a print sheet in a print run during the production of a print product, can be received, and on the other hand to provide a data output, through which data can be transmitted to the press system, a management module, through which the data of the color extraction can be associated with other data of the print product.

12 Claims, No Drawings

METHOD FOR TRANSMITTING A COLOR EXTRACTION AND A MANAGEMENT INFORMATION SYSTEM

BACKGROUND OF THE INVENTION

The invention relates, on the one hand, to a method for transmitting a color extraction, defining positions of pixels of a print color to be deposited on a print sheet in a print run, from a prepress system to a press system in order to produce a print product, and on the other hand, to a management information system for integrated planning and control of the production of print products in a networked graphic production, wherein a prepress system and a press system can be connected to the management information system.

Such management information system (MIS) for graphic production, which can also be networked over several locations, is provided by the applicant under the product name "HIFLEX" (www.hiflex.de). The known MIS in a networked print shop, besides facilitating a central control and monitoring of the connected executions systems, e.g. prepress-, press-, and postpress processing systems and warehouse- and distribution systems, also facilitates central date- and execution planning for all occurring print jobs, including job quote generation, based on the parameters of these plans, and accounting, statistics, and quality control, based on the data of the actual execution, in the context of the production of print products.

In print shops, which use the known MIS, furthermore, a method as described above is generally known. According to the rules developed by the consortium "International Cooperation for the Integration of Processes in Prepress, Press and Postpress" ("CIP4-Consortium", www.cip4.org), or previously developed by the predecessor organization, the prepress system generates a so-called "color extraction" in the context of the production of a print product for each print sheet in print colors, e.g. in the basic colors cyan, magenta, yellow, and black. Said color extraction defines the positions of those image pixels on the print sheet in a bit map file, onto which the respective print color is to be printed.

CIP3 and CIP4 specify the transmission of color extracts with a resolution, which is reduced compared to the print, respectively for the offset print. Such color extractions allow next to the determination of the required "color profiles", in particular the computation of reduced preview images (so-called "previews"), based on which the operating personnel obtains a coarse optical impression of the respective print run at the print system, and can thus monitor, if the respective print plate belongs to the job to be currently processed, and if the color extraction matches its job.

Color extractions with all image pixels required for the print in the respective print color are transmitted from prepress in particular to digital printers and color lasers, and to offset print systems with an integrated exposure device in the "Tagged Image File Format" (TIFF), developed already in the 90's for color separation with 1 bit color depth ("black and white").

A color profile for offset printing includes a diagram of the ink requirement, when printing the respective print color on the respective print sheet, plotted over the longitudinal direction of the print cylinder, when passing through the press: the ink requirement over the width of the print sheet is high, when many pixels in the respective color are to be printed in a column extending in circumferential direction of the print cylinder, it is low when only few pixels are to be printed. During printing, the print cylinder, or the print plate is loaded in the press with variable amounts of print ink according to the color profile, along the longitudinal direction of the print cylinder by means of a slide control.

The CIP4 concepts are based on the object to standardize communications between print shop, designer, advertising agency, customer for print products, and subcontractors of contractors in the context of a networked graphic production for all production possibilities and eventualities in a flexible manner and without restrictions. The "job definition format" (JDF), defined for this purpose, and the "job messaging format" (JMF), as a subset of JDF, is based on the "extensible markup language" (XML) of a also generally known META language, developed by the "World Wide Web Consortium" (W3C, www.w3.org) for defining document types, and shall be used as a standard data format for describing processes and products, according to the intention of the CIP4-consortium, not only in all production areas of a network print shop, in particular in sales, job costing, order processing, production planning and control, in production itself, prepress, press, postpress and shipping, in the cross sectional areas, materials-, and warehouse management, financial and payroll accounting, controlling, cost accounting, and quality assurance.

Through vertical integration of data, on the one hand of the production process, and on the other hand, of the accounting sectors, JDF shall facilitate a standardized documentation of the relevant target- and actual data, and seamless production control. In particular, a JDF job shall only be described once in one form, which all process participants understand, also in external communications with customers and subcontractors and their executing systems in the man-machine and machine-machine communication over all language- and platform boundaries.

According to the "JDF specification 1.2" (www.cip4.org), a management information system (MIS) as a functional component of the JDF workflow in a networked graphic production shall monitor processes and communication between system components and system control in the context of this workflow. A press system ("press controller") controls print equipment and its communication amongst each other, and also with other components. A prepress system ("pre-press workflow system") provides information from prepress to the press system, in particular from layout, reproduction, and print plate production, including page- and sheet mounting. On the one hand, specially provided hardware systems (in particular also provided by software), on the other hand, also the respective software for these systems is designated respectively as MIS, prepress- and press systems in the context of the known implementations in networked print shops.

A specification for interoperability of the prepress- and press systems ("pre-press to conventional printing ICS" version 1.0, www.cip4.org, Jan. 20, 2005) defines the method, provided according to the CIP4 concepts, for transmitting the color extractions from the prepress system to the press system: the color extractions are initially stored by the prepress system in "portable network graphics" file format (PNG specified according to ISO/IEC 15948:2003), e.g. together with an XML file referencing it, together with additional management information in an area provided for this purpose. The pre-press system then informs e.g. the press system that the color extractions have been stored, and the press system independently retrieves the information, where the color extractions are stored.

Contrary to the philosophy of the CIP4-Consortium, and the concepts of JDF based thereupon, there are multiple restrictions in real life operations of networked print shops, and there are specific differences with respect to the information, which the particular process participants need, or actually use. Information which is useful, or even necessary for one process partner, can be redundant for other process partners or can even be detrimental for useful operations.

For example, execution systems in different stages of development are often used in the same business. Besides equipment, which supports the CIP4-standard, these are still in particular prepress and press systems, which can provide or read color extracts only in "CIP3 print production format" (PPF, a text format, which receives bit maps in the form of MIME coded binary data). The integration of such older systems into a networked print shop impedes or denies the implementation of a complete CIP4-workflow.

In the context of known implementations of CIP workflow in networked graphic productions in the triangular relationship between MIS, prepress-, and press system, color extractions are directly transmitted from the prepress- to the press system, thus not over MIS.

Furthermore, the known CIP4-workflows do not offer a continuously implemented possibility to interfere in a controlling manner, and where necessary in a correcting manner, with the communication between prepress- and press system. Furthermore, in the course of the processing of a print job in prepress, e.g. the number or the systematic allocation of the print plates to be produced (typically due to customer specifications changed at short notice) can change.

In particular, through such changes in the course of the processing of a job, when already before JDF data have been transmitted to the press system, but also generally through different machine specific restrictions with respect to the form and content of communicated data through different data sources and different data volume, e.g. through different color designations in MIS, and on the side of the customer in the pre-press system, the consistency of the job data can be impaired. Also in this case, the allocation of the color extractions to the print runs on the press system requires considerable and error prone manual interference.

It is the object of the invention to provide a method for transmitting color extractions, allowing a coherent management also of the communication between press- and prepress systems in the context of a CIP4 workflow.

SUMMARY OF THE INVENTION

Based on the known method, it is suggested according to the invention that the color extraction from the prepress system is initially transmitted to a management information system and subsequently from it to the print system. Contrary to the CIP4 specification, the MIS thus manages also the communications between pre-press and press, according to the method according to the invention. This way, the MIS can assure the consistency of the transmitted data with the remainder of the job related data also in this instance.

In a preferred embodiment of the method according to the invention, together with the color extraction from the management information system, instead of first characterizing data, transmitted by the prepress system, second characterizing data, stored in the management information system, are transmitted to the press system.

Characterizing data are in particular technical data like sheet- and print process numbers, business data, like customer and job numbers, and identifiers from the area of data management, like identifiers for data fields and file names. Known prepress systems e.g. issue particular identifiers for the print plates to be produced, based on which data, in particular also data of the color extractions transmitted to the press system, are allocated to the respective print run.

Instead of this particular identifier, which is system specific for prepress, according to the method according to the invention, the identifier of the print run, which was allocated in the MIS in the context of the planning for quote generation, can be transmitted to the press system. Based on the uniform identifier, the data from prepress can now be allocated in a unique manner in the press system, and in particular without manual interference, to the remaining data of the pending print jobs. The method according to the invention allows any processing of the characterizing data transmitted by the prepress system, and the adaptation to the requirements of the press system through change and expansion.

Based on the known management information system, it is suggested according to the invention to provide, on the one hand, a data input, through which the data of a color extraction transmitted by the prepress system, defining positions of pixels of a print color to be deposited onto a print sheet by a print run in order to produce a print product, can be received, and on the other hand, to provide a data output, through which the data for determining a color profile of the print sheet can be transmitted to the print system. A processing module, through which the data of the color extraction can be associated with other data. The MIS according to the invention facilitates the execution of the method according to the invention previously described. The data inputs and outputs of the MIS can be realized in particular through data interfaces for accessing data areas, e.g. designated by URL, or through communication interfaces, or through combinations thereof.

Preferably, a MIS according to the invention comprises a storage element, in which the data of the color extract can be stored for documentation purposes and/or for subsequent reuse. In the context of known implementations in networked print shops, the data of the color extractions are not centrally managed. The central storage, on the one hand, allows the repetition of a previous job in a particularly simple manner. On the other hand the stored color extractions, as graphic element, offer the possibility of an optical intuitive association of the data from the prepress with other data of a print job.

An MIS according to the invention furthermore preferably comprises a visualization module, through which the color extraction can be visualized on a display element. In the context of known implantations in networked print jobs the operator of the print system, which often works under time pressure, performs a visual check with respect to the association of the data from the prepress with the print jobs. This check can also be performed through visualization of the color extractions on a screen of the MIS, already in advance through an operator of the MIS.

In a particularly preferred manner, a MIS according to the invention comprises a computation module, by means of which an image of the print sheet with natural appearance can be computed from a plurality of color extractions. The visualization of such an image facilitates, compared to the black and white single color extractions, once more the optically intuitive association of the data from the prepress with the data of the print jobs.

In another preferred embodiment of the MIS according to the invention, this MIS comprises a conversion module, through which the data of the color extract, which are transmitted by the prepress system as a bit map in PPF-format according to CIP3, are convertible in an XML-format according to CIP4 with reference to the bit map, or to a bit map in PNG-format, derived said bitmap.

The MIS according to the invention can then also be used without additional (external) conversion in the context of a networked graphic production, which, on the one hand, comprises a prepress system, which requires a color extraction, since CIP4 in this system is not yet, or at this point, not completely implemented, or due to other e.g. organizational restrictions, only provides it as a PPF file, and which, on the other hand, requires storing the color extract, or passing it on for further processing according to CIP4.

DETAILED DESCRIPTION OF A PREFERRED EMBODIMENT

The invention is subsequently described with reference to an embodiment. A fictitious networked offset print shop manages by means of an MIS, according to the invention, among others a print system comprising several print presses and two prepress systems, each comprising a plate exposition device, an older one, which provides color extracts according to CIP3 in the form of PPF files, and a newer one, which provides them according to CIP4 as PNG files. Both pre-press systems are operated by customers directly through proper web interfaces. The older system records customer inputs and processing up to the completion of the pre-press in the respective PPF file. The newer system reports each customer input and also the status of the respective processing according to the CIP4 specification in the form of JMF-reports directly to the MIS.

The prepress systems comprise respective data interfaces, through which the color extracts can each be written into a data range, designated by the URL. The data range can be selected in the newer system separately for each print job by means of the MIS, in the older system only globally through a proper console. As a data range respective hot folders are established on a central file server. The prepress system furthermore comprises communication interfaces which are provided for the connection (each according to CIP3 or CIP4) with the press system. These communication interfaces, however, are not connected to the press system, but to the MIS.

The print system manages print presses, which can only process color extractions in PPF-format according to CIP3, and also CIP4 compatible print presses. The press system comprises a data interface for read access to data ranges, as well as a communication interface, which is also provided for the connection with one or several prepress systems. Also here, the communication interface is not connected to the prepress system, but to the MIS.

By means of a job costing module of the MIS, quotes are generated for two incoming requests. For this purpose, a respective detailed execution planning is already being performed, also comprising the allocation of identifiers for the print plates provided. When print orders come in, corresponding to both quotes, the execution of the processes of the prepress is scheduled on the older prepress system for the one job, and on the newer prepress system for the other job.

On the older system, the job is defined through manual input on the system console. Up to the completion of the prepress, there are no changes compared to the plan. The operator produces a print plate with an identifier, predetermined by the system, and reports the completion over a BDE-terminal to the MIS. The prepress system stores the color extract with the respective identifier in PPF-format in the set hot folder.

The MIS comprises a program access to monitoring the data transfer from the prepress to the press, which is set up in production planning of the print job on a separate workstation. After completing prepress for the job executed on the older system, the operator in production planning receives a report regarding the completion of the print plates, the input of the PPF files in the respective hot folder, and through the respective report, originally provided by the prepress system for the press system.

The MIS calculates a RGB image with natural appearance from the color extractions and visualizes it on the screen together with the other data of the print job, in as far as they are known from the prepress system. Besides the job- and print sheet number and an identifier for front- and back side, this is in particular information regarding the page format, page number, and coloring of the print product ordered. From the list of the print runs scheduled on the print system in the context of this job, the MIS selects those, which mostly concur with respect to this data with the information received from the prepress system, and introduces them to the operator of the MIS in the form of a selection list. The operator of the MIS then assigns the data from the prepress system manually to one of these print runs.

The MIS converts the PPF data from the older prepress system into a CIP4 compatible format and stores this data in a data range on the central file server. Furthermore, it transmits a JMF report to the print system through the communication interface in the format provided for the communication between the prepress and the press. In this report, besides the URL of the color extractions, in addition to the identifiers of the print plates and the respective color extractions, the Job-PartIDs defined during planning are transmitted from the prepress system All reports to the MIS from the press now use these JobPartIDs and can be directly assigned this way to the respective print job.

On the newer prepress system, the job is automatically defined, directly based on the data from the MIS. During processing, eight pages are added according to customer requirements. Due to the changes, an adaptation of the planning is performed in the MIS, in particular also for the additional print runs additional identifiers are allocated, which typically do not coincide with the additional identifiers from the prepress system.

When the prepress is completed, the newer prepress system writes the color extractions into a data range, specifically selected for this job on the central file server, and reports the URL of these data according to CIP4 (regardless of this report also going to the MIS). Based on the URL the MIS attempts to recognize the associated print run. The operator of the MIS has to manually perform the allocation and has to confirm the allocation, proposed by the MIS, and can check the correctness anytime, based on the automatically generated colored illustration of the print plates.

Since the added print runs are to be printed on an older not yet CIP4 capable print press, the MIS now converts the respective color extractions from PNG-format into PPF-format, and provides them to the press system with the report of the respective URL, referencing the JobPartIDs provided by the planning.

In the MIS, not only each communication with the particular execution systems is recorded in the print shop, and stored as a copy for documentation purposes. Additionally, the color extracts and the computed natural RGB illustrations are stored in PNG-format with respect to all print jobs, which have already run through the prepress. When calling up such a job from this database, also these illustrations are shown as required and allow the operator of the MIS a simple, intuitive content control. Such stored jobs can additionally go into print again with significantly reduced effort, in particular without repeated execution of the prepress.

What is claimed is:
1. A method for transmitting a color extraction comprising the following steps,
defining positions of pixels in a print color to be deposited onto a print sheet in a print run, in order to produce a print product, from a prepress system to a press system, wherein data of a color extraction is initially transmitted from the prepress system to a management information system through a communication interface provided for the connection with the press system, and subsequently from the management information system to the press system through a communication interface provided for the connection with the prepress system, and wherein the management information system integrates planning and control of print products production throughout a JDF networked graphic production system.

2. A method according to claim 1, wherein through the data of the color extraction, the management information system transmits, instead of first characterizing data, transmitted by the prepress system, second characterizing data, stored in the management information system, to the press system.

3. A method according to claim 1, further comprising a second prepress system, wherein one of the prepress systems uses color extractions according to CIP3 format but not CIP4 format and the other of the prepress systems uses color extractions according to the CIP4 format.

4. A method according to claim 3, wherein the management information system receives the color extractions in CIP4 format from a communication interface and the management information system converts the color extractions into CIP3 format for use by the prepress system that uses color extractions according to CIP3 format but not CIP4 format.

5. A management information system for integrated planning and control of the production of print products in a networked graphic production comprising, a prepress system and a press system can be connected to the management information system, wherein the prepress system sends data of a color extraction to the management information system through a communication interface provided for the connection with the press system, and then the management information system sends the data of the color extraction to the press system through a communication interface provided for the connection with the prepress system, wherein a data input, through which the data of the color extraction, transmitted by the prepress system, defining positions of pixels of a print color to be deposited onto a print sheet in a print run for the production of a print product, can be received through a data output, by which the data of the color extraction can be transmitted to the press system, and wherein the management information system integrates planning and control of the production of print products throughout a JDF networked graphic production system.

6. A management information system according to the claim 5, further comprising a management module, through which the data of the color extraction can be associated with other data of the print product.

7. A management information system according to claim 6, further comprising a storage element, on which the data of the color extraction can be stored for documentation purposes or for later reuse.

8. A management information system according to claim 7, further comprising a visualization module, by means of which the data of the color extraction can be visualized on a display element.

9. A management information system according to claim 8, further comprising a computation module, through which an image of the print sheet with natural appearance can be computed from a plurality of color extractions.

10. A management information system according to claim 9, further comprising a conversion module, through which the data of the color extraction, which are transmitted by the prepress system as a bit map in PPF-format, according to CIP3, can be converted into an XML-format according to CIP4 with reference to the bit map, or to a bit map derived from said bit map in PNG-format.

11. A management information system according to claim 5, further comprising a second prepress system, wherein one of the prepress systems uses color extractions according to CIP3 format but not CIP4 format and the other of the prepress systems uses color extractions according to the CIP4 format.

12. A management information system according to claim 11, wherein the management information system receives the color extractions in CIP4 format from a communication interface and the management information system converts the color extractions into CIP3 format for use by the prepress system that uses color extractions according to CIP3 format but not CIP4 format.

* * * * *